(12) United States Patent
Buckley

(10) Patent No.: US 7,925,104 B2
(45) Date of Patent: Apr. 12, 2011

(54) DECOMPRESSION FOR PRINTING AND DISPLAY SYSTEMS

(75) Inventor: Robert R. Buckley, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1134 days.

(21) Appl. No.: 11/359,715

(22) Filed: Feb. 22, 2006

(65) Prior Publication Data

US 2007/0140573 A1 Jun. 21, 2007

Related U.S. Application Data

(63) Continuation-in-part of application No. 11/311,876, filed on Dec. 19, 2005, now abandoned.

(51) Int. Cl.
*G06K 9/36* (2006.01)
*G06K 9/46* (2006.01)
(52) U.S. Cl. ........................ 382/233; 382/240
(58) Field of Classification Search .......... 382/232, 382/233, 240, 248; 375/240.11, 240.19
See application file for complete search history.

(56) References Cited

U.S. PATENT DOCUMENTS

| | | | |
|---|---|---|---|
| 6,885,395 B1 * | 4/2005 | Rabbani et al. | 348/231.1 |
| 6,933,970 B2 | 8/2005 | Koshiba et al. | |
| 2002/0083234 A1 | 6/2002 | Izawa | |
| 2004/0170331 A1 | 9/2004 | Henry | |
| 2004/0184665 A1 * | 9/2004 | Guillou et al. | 382/232 |
| 2006/0165166 A1 * | 7/2006 | Chou et al. | 375/240.05 |

\* cited by examiner

*Primary Examiner* — Yubin Hung

(57) ABSTRACT

A method for decompressing a job in a document management system, such as a printer, scanner or display device, is provided. The method includes buffering the compressed image data, and decompressing the buffered compressed image data such that the decompressing varies as a function of a resolution level and either a first set of quality layers or a second set of quality layers. The number of quality layers in the first quality layer set is greater than the number of quality layers in the second quality set and, pursuant to the decompressing, the resolution level is corresponded with the second quality layer set so that the compressed image data is decompressed with less quality layers than in the first quality layer set.

10 Claims, 6 Drawing Sheets

DECOMPRESSION FOR PRINTING AND DISPLAY SYSTEMS

CROSS-REFERENCE TO RELATED APPLICATIONS

This application is a continuation-in-part of U.S. application Ser. No. 11/311,876, filed Dec. 19, 2005 now abandoned, the entire disclosure of which is incorporated herein by reference.

This work was performed during the course of a contract with Datatrac Information Services, Inc. and the Library of Congress (Prime Contract No. GS-00K-97AFD-2212). Accordingly, the U.S. Government may have certain rights in the claimed invention.

BACKGROUND AND SUMMARY

The disclosed embodiments relate to an improved approach for decompressing an image with a document processing platform, such as a scanner, printer or display device.

Under the JPEG2000 Standard, each image may be divided into rectangular tiles. If there is more than one tile, the tiling of the image creates tile-components. An image may have multiple components. For example, a color image might have red, green and blue components. Tile-components can be extracted or decoded independently of each other.

After tiling of an image, the tile-components are decomposed into one or more different decomposition levels using a wavelet transformation. These decomposition levels contain a number of subbands populated with coefficients that describe the horizontal and vertical spatial frequency characteristics of the original tile-components. The coefficients provide frequency information about a local area, rather than across the entire image. That is, a small number of coefficients completely describe a single sample. A decomposition level is related to the next decomposition level by a spatial factor of two, such that each successive decomposition level of the subbands has approximately half the horizontal resolution and half the vertical resolution of the previous decomposition level.

Although there are as many coefficients as there are samples, the information content tends to be concentrated in just a few coefficients. Through quantization, the numerical precision of a number of coefficients may be reduced with a disproportionately low introduction of distortion (quantization noise). Additional processing by an entropy coder reduces the number of bits required to represent these quantized coefficients, sometimes significantly compared to the original image.

The individual subbands of a tile-component are further divided into code-blocks. These code-blocks can be grouped into precincts. These rectangular arrays of coefficients can be extracted independently. The individual bit-planes of the coefficients in a code-block are entropy coded with three coding passes. Each of these coding passes collects contextual information about the bit-plane compressed image data.

The bit stream compressed image data created from these coding passes is grouped in layers. Layers are groupings of successive coding passes from code-blocks. Although there is great flexibility in layering, the premise is that each successive layer contributes to a higher quality image. Code-blocks of subband coefficients at each resolution level are partitioned into rectangular areas called precincts.

Packets are a fundamental unit of the compressed codestream. A packet contains compressed image data from one layer of a precinct of one resolution level of one tile-component. These packets are placed in a defined order in the codestream.

The codestream relating to a tile, organized in packets, is arranged in one, or more, tile-parts. A tile-part header, comprised of a series of markers and marker segments, or tags, contains information about the various mechanisms and coding styles that are needed to locate, extract, decode, and reconstruct every tile-component. At the beginning of the entire codestream is a main header, comprised of markers and marker segments, that offers similar information as well as information about the original image.

The codestream is optionally wrapped in a file format that allows applications to interpret the meaning of, and other information about, the image. The file format may contain data besides the codestream.

The decoding of a JPEG2000 codestream is performed by reversing the order of the encoding steps. FIG. 2 is a block diagram of the JPEG2000 standard decoding scheme that operates on a compressed image data codestream. Referring to FIG. 2, a bitstream initially is received by data ordering block 101 that regroups layers and subband coefficients. Arithmetic decoder 102 uses contextual information from previously coded coefficients provided by the bit modeling block 103 about the bit-plane compressed image data, and its internal state, to decode a compressed bit stream.

Next, the codestream is dequantized by dequantization block 104, which may be dequantizing based on a region of interest (ROI) as indicated by ROI block 105. After dequantization, an inverse wavelet/spatial transform is applied to the coefficients via transform block 107, followed by DC level shifting and optional component transform block 108. This results in generation of a reconstructed image.

To more fully comprehend the disclosed embodiments, the following provides further background and/or clarification regarding resolution levels and quality layers. As is known, a JPEG 2000-compressed image can have multiple resolution levels and multiple quality layers. Referring to FIG. 3, an image with multiple subbands and resolution levels is shown. The original image is wavelet transformed to create the four subband images LL1, LH1, HL1 and HH1—the notation signifies the different horizontal and vertical combinations of low-pass L and high-pass H wavelet filters. These subband images replace the original image and can be used to recreate the original image. Referring still to FIG. 3, the LL1 subband may be wavelet transformed to create four new subband images LL2, LH2, HL2 and HH2, the new subband images replacing the LL1 subband image. Even though FIG. 3 shows only 2 levels of wavelet transform, this process of wavelet transforming successive images can continue well beyond two levels. Indeed, the JPEG2000 standard permits up to 32 wavelet transforms; however, most applications use 5 or 6 levels. JPEG2000 creates a compressed image by quantizing and entropy encoding the subband images.

By accessing the subband images, a JPEG2000 decoder is able to display image at different resolution levels. For example, to display a $\frac{1}{16}_{th}$ size image, a JPEG2000 decoder accesses and decompresses just the LL2 subband. To display a quarter-sized image, it accesses and decompresses the LH2, HL2 and HH2 subband images and combines them with the LL2 subband image to recreate the LL1 subband image.

FIG. 4 is an exemplary schematic representation of a compressed image with 4 resolution levels and 4 quality layers. In this example, compressed image data exists for each combination of quality layer and resolution level; however, in other examples, some combinations might not contain any compressed data. In general, the amount of compressed data varies with the combination of quality layer and resolution level. As is known, a quality layer represents an increment in quality of the image at full resolution. A given quality layer represents the image compressed to a given bitrate. Quality layers cut across resolution levels to obtain the specified amount of compressed data and a specific bitrate. In the exemplary schematic of FIG. 4, Layer 1 represents the lowest quality image. Layer 4 contains data from all the subbands at all resolution levels, and represents the final increment in quality. To display the highest quality decompressed image requires data from Layers 1 through 4.

In accordance with one aspect of the disclosed embodiments, there is provided a printing system for processing a print job including compressed print related data stored in an image buffer. The printing system includes a decompression system for decompressing the compressed print related data; and the decompression system includes a processor and a program for decompressing of the compressed print related data. The processor functions with the decompression program such that the decompressing varies as a function of a resolution level and either a first set of quality layers or a second set of quality layers. The number of quality layers in the first quality layer set is greater than the number of quality layers in the second quality set, and, pursuant to the decompressing, the resolution level is corresponded with the second quality layer set so that the compressed image data is decompressed with less quality layers than in the first quality layer set.

In accordance with another aspect of the disclosed embodiments, there is provided a decompression system for decompressing a job in a document management system, the job including compressed image data and the compressed image data being buffered in memory. The decompression system includes a processor and a decompression program operating with the processor in such a way that the decompressing varies as a function of a resolution level and either a first set of quality layers or a second set of quality layers. The number of quality layers in the first quality layer set is greater than the number of quality layers in the second quality set, and, pursuant to the decompressing, the resolution level is corresponded with the second quality layer set so that the compressed image data is decompressed with less quality layers than in the first quality layer set.

In accordance with yet another aspect of the disclosed embodiments, there is provided a decompression system for decompressing to either a first image type or a second image type. The decompression system includes a processor and a decompression program. The decompression program operates with said processor in such a way that the decompressing varies as a function of either the first image type and a first set of quality layers or the second image type and a second set of quality layers. The number of quality layers in the first quality layer set is greater than the number of quality layers in the second quality layer set, and the first quality layer set is used for decompressing the first image type, and the second quality layer set is used in decompressing the second image type.

In accordance with another aspect of the disclosed embodiments, there is provided a method for decompressing a job in a document management system, the job including compressed image data. The method includes buffering the compressed image data and decompressing the buffered compressed image data such that the decompressing varies as a function of a resolution level and either a first set of quality layers and a second set of quality layers. The number of quality layers in the first quality layer set is greater than the number of quality layers in the second quality set and, pursuant to said decompressing, the resolution level is corresponded with the second quality layer set so that the compressed image data is decompressed with less quality layers than in the first quality layer set.

DESCRIPTION OF EMBODIMENTS

Figure 1:
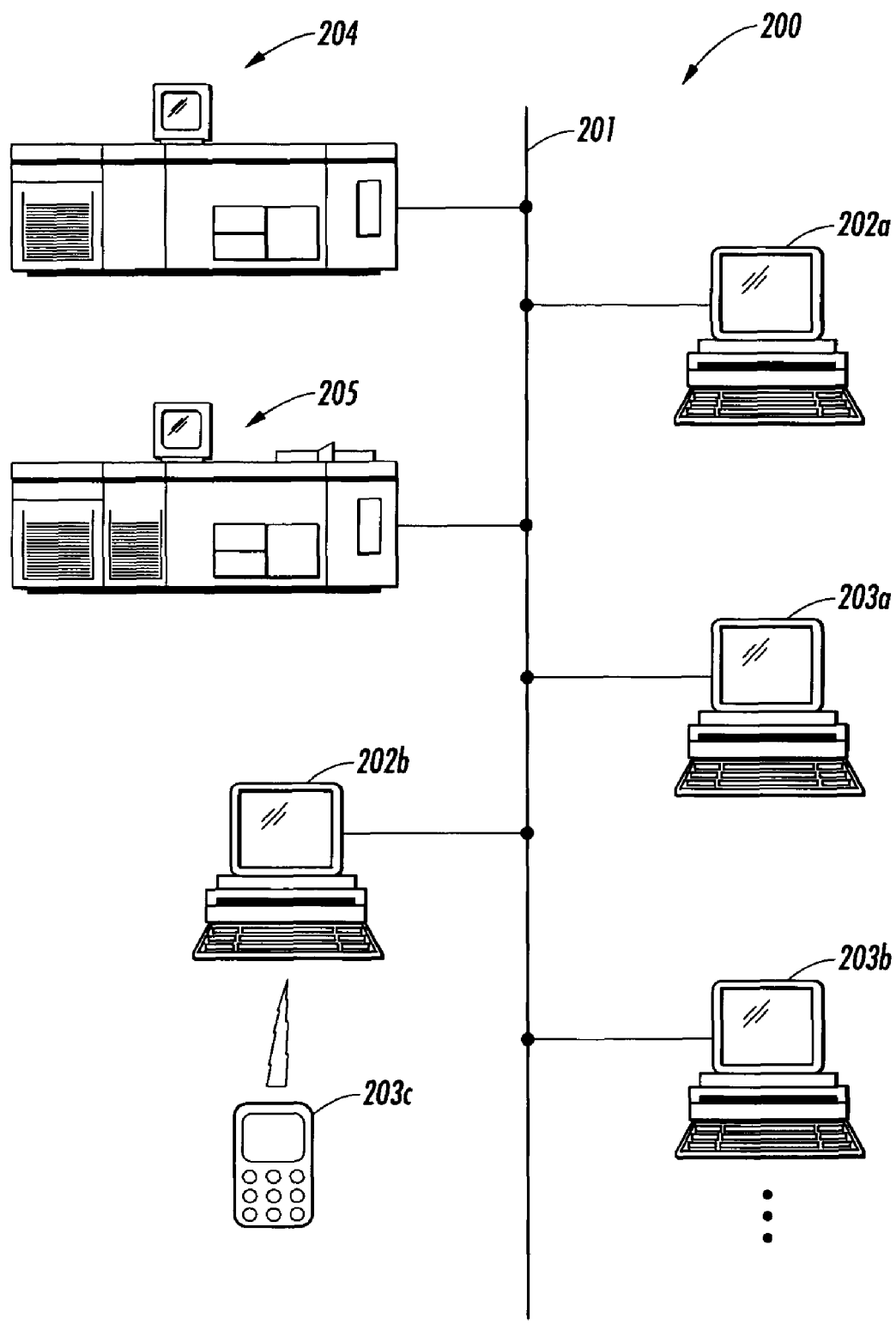
FIG. 1 is a schematic, planar view of a network printing system.
Figure 2:
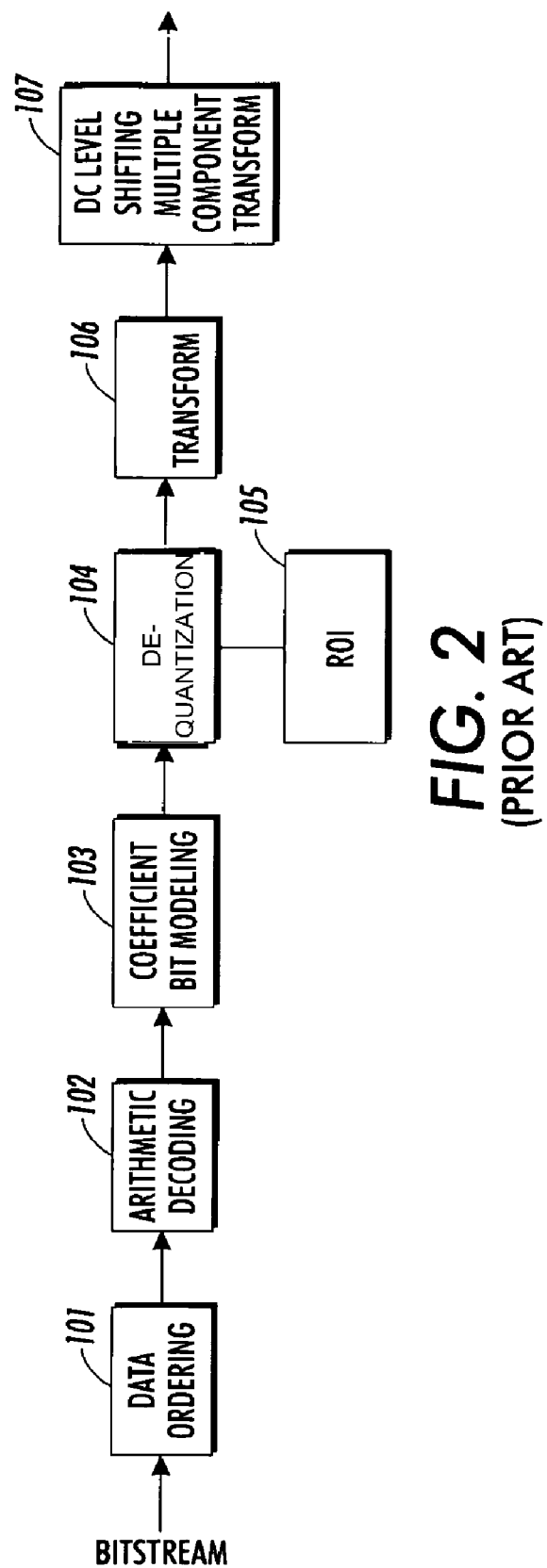
FIG. 2 a prior art flow diagram showing the decoding of a JPEG2000 code-stream.
Figure 3:
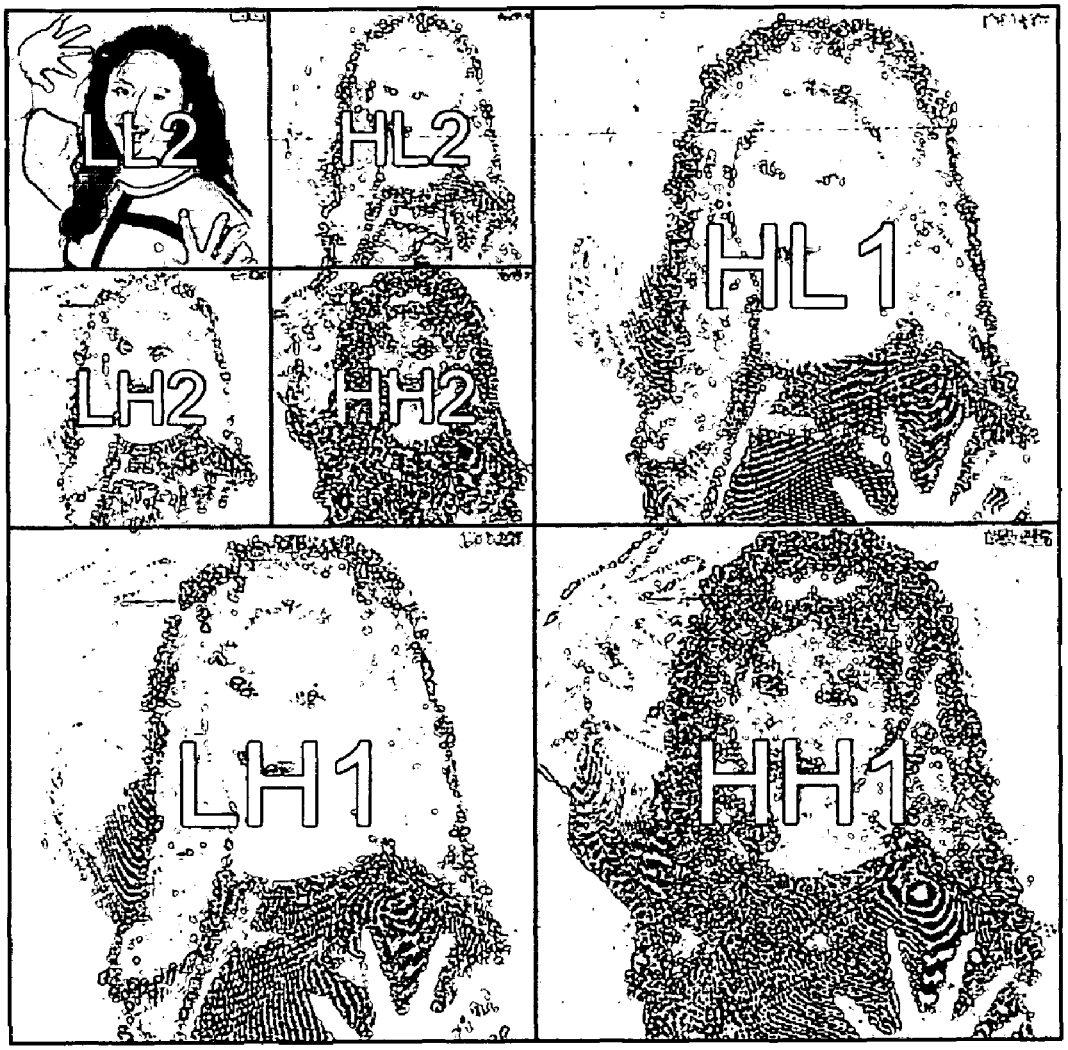
FIG. 3 is a schematic, planar view of an image with two levels of wavelet transform.
Figure 4:
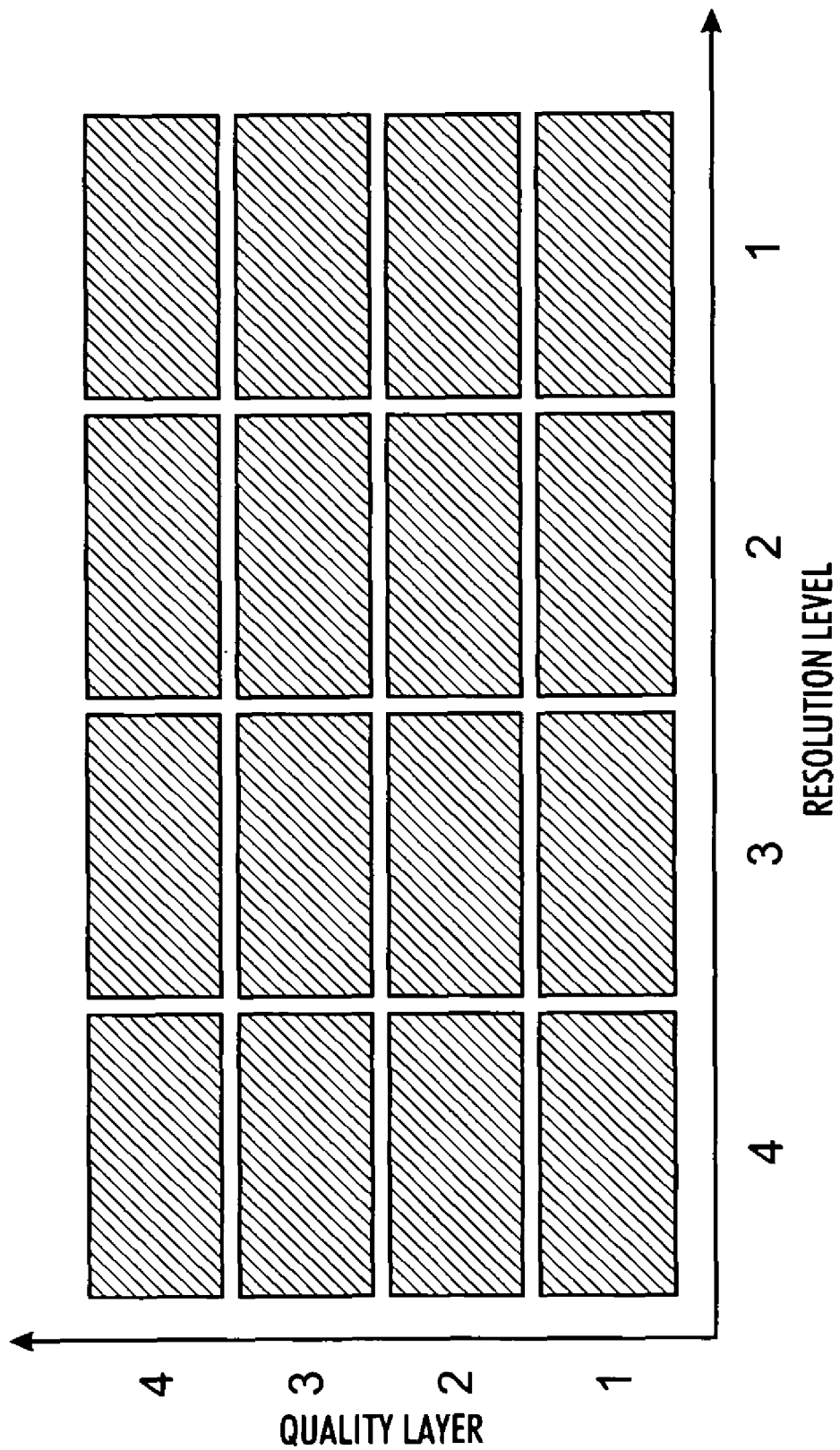
FIG. 4 is an exemplary schematic diagram illustrating the relationship between resolution levels (subbands) and quality layers.

Referring now to FIG. 1, a networked document processing system (one type of "document management system") suitable for use with the disclosed embodiments is designated with the numeral 200. A computer 202a connected to a suitable communication channel 201 is adapted to function as a server, while computers 203a and 203b serve as clients. The communication channel may include a wide range of connectivity affording for a significant number of wired and wireless clients/devices. In one contemplated embodiment, the communication channel would support handheld devices, including cellular telephonic devices and personal digital assistants (such as handheld device 203c communicating with a suitable server 202b). As contemplated in FIG. 1, a device labeled, in part, with the numeral 202 refers to a server, while a device labeled, in part, with the numeral 203, refers to a client. As shown in FIG. 1, each of the computers includes a keyboard and display. Preferably, the display includes a monitor and each client 203 interacts with its computer and/or the network by way of a graphic user interface (not shown).

The system 200 further includes printing systems 204 and 205, each of which is connected to the network 201. At least one of the systems 204 and 205 is a color copier capable of full color scanning, printing and the like. In addition, although not shown, machines other than the above-mentioned printing systems, such as scanners, printers, facsimile devices or the like are connected to the network 201.

For the disclosed embodiments, at least some of the clients 203 run software applications that permit, among other things, desktop publishing (DTP) functionality. Through use of DTP, all sorts of texts/graphics (image information) can be created/edited at the clients 203. The computer 203, through use of a conventional print driver, converts the produced image information into a page description language (PDL). The converted image information is included in a job for transmission, via the network 201, to one of the systems 204 and 205. Each one of the printing systems 204 and 205, which has its own user interface for monitoring print job requests, is adapted to print hardcopy image renderings of selected electronic images developed at each client 203.

In practice, many jobs are stored and/or transmitted in a compressed format. For instance, image data is typically transmitted, in compressed form, from each one of the clients 203 to its intended target device on the network. Further, pursuant to scanning documents into an electronic job form, it is very useful to compress the resulting scan job for storage in memory over any considerable time interval. Even further, compression of data is particularly useful in handheld device application where memory can be quite limited. Finally, compression is particularly helpful in archiving operations where large quantities of memory would be required to store uncompressed image data, particularly uncompressed color related image data. Various known standards, such JPEG2000 are particularly well suited for either placing a job in a compressed form, or expanding it for processing (such as hardcopy rendering or viewing on a display). The manner in which jobs are compressed and/or decompressed with JPEG 2000 can be readily understood by reference to one or more of several issued patents, such as U.S. Pat. No. 6,933,970, the pertinent portions of which are incorporated herein by reference. Additionally, it will be appreciated that a "job" or "document job" could comprise one of a large variety of electronic file types associated with a broad range of image processing devices, and that a document management system would commonly include one or more of such image processing devices.

Referring specifically now to a known exemplary approach, the data representing a JPEG2000 compressed image with multiple resolution levels and quality layers is stored in resolution-major order so that the retrieving of data for resolution level N of a compressed image with M≧N transform (or resolution) levels and Q quality layers corresponds to the following pseudocode fragment:

---
For resolution level R = M to N
For quality layer L = 1 to Q
Get compressed data D(L, R)
---

For some combinations of L and R, there may be no compressed data.

It has been observed that an improvement in JPEG2000 functionality can be achieved by making the range of quality layers L dependent on the resolution level. As will appear, the disclosed embodiments contemplate a technique in which the number of quality layers that are retrieved, sent and decompressed varies with the specified resolution: the lower the resolution, the fewer the number of layers. More particularly, the technique contemplates the selection of a number of layers according to the specified resolution level.

A common practice in the area of JPEG2000 decompression is to retrieve all quality layers when rendering an image at a given resolution. Hence for each resolution, the common practice is to correspond each resolution with the full set of possible quality layers so that all of the layers are retrieved for each specified resolution. It has been observed, however, in connection with tests performed on images, that for low-resolution images (corresponding to high resolution levels), the higher-numbered quality layers made little or no apparent difference to the quality of the decompressed image.

That is, experimentation indicates that there appears to be little difference in perceived quality between an image decompressed at a resolution using four layers and an image decompressed at the same resolution using 12 quality layers. The difference has been found to be more apparent between images (of the same resolution) with four and two quality layers, although the image with two quality layers may be acceptable in many applications. Decompressing an image with four layers (having a given resolution) has been found to be faster than decompressing the same image (having the same given resolution) with 12 layers, and decompressing the same image with two layers is even faster than decompressing the same image with 12 layers. In other experiments, images were decompressed to five resolution levels, and the speed improvement for four layers, compared to 12, was found to be even greater when decompressing to fewer resolution levels.

Based on the work of the disclosed embodiments, the pseudocode fragment referred to above would be recast as follows:

---
For resolution level R = M to N
For quality layer L = 1 to f(R)
Get compressed data D(L, R)
---

In the above pseudocode, the highest quality layer decoded f(N), i.e., the highest quality decoded, is a function of the number of resolution layers decoded. Alternatively, the function could be image dependent, in which case the number of quality layers employed or the highest quality decoded would depend on the image quality of the subject image to be expanded.

Written in Kakadu™ software ("Kakadu" is compliant software for JPEG2000 developers), the following would serve to generate a five-resolution level, 12-quality-layer JPEG2000 compressed image:
kdu_compress -i input.pgm -o output.jp2-rate
1, 0.77, 0.6, 0.44, 0.3, 0.22, 0.15, 0.103, 0.07, 0.043, 0.025, 0.015
Clevels=5 Corder=RLCP Based on concepts disclosed herein, the Kakadu command line in a script to decode the image could be expressed as follows:
kdu_expand -i output.jp2 -o decode.pgm -reduce $N -layers $f($N)
$f corresponds the number of layers that is decoded with the number of resolution levels that are decoded.

Figure 5:
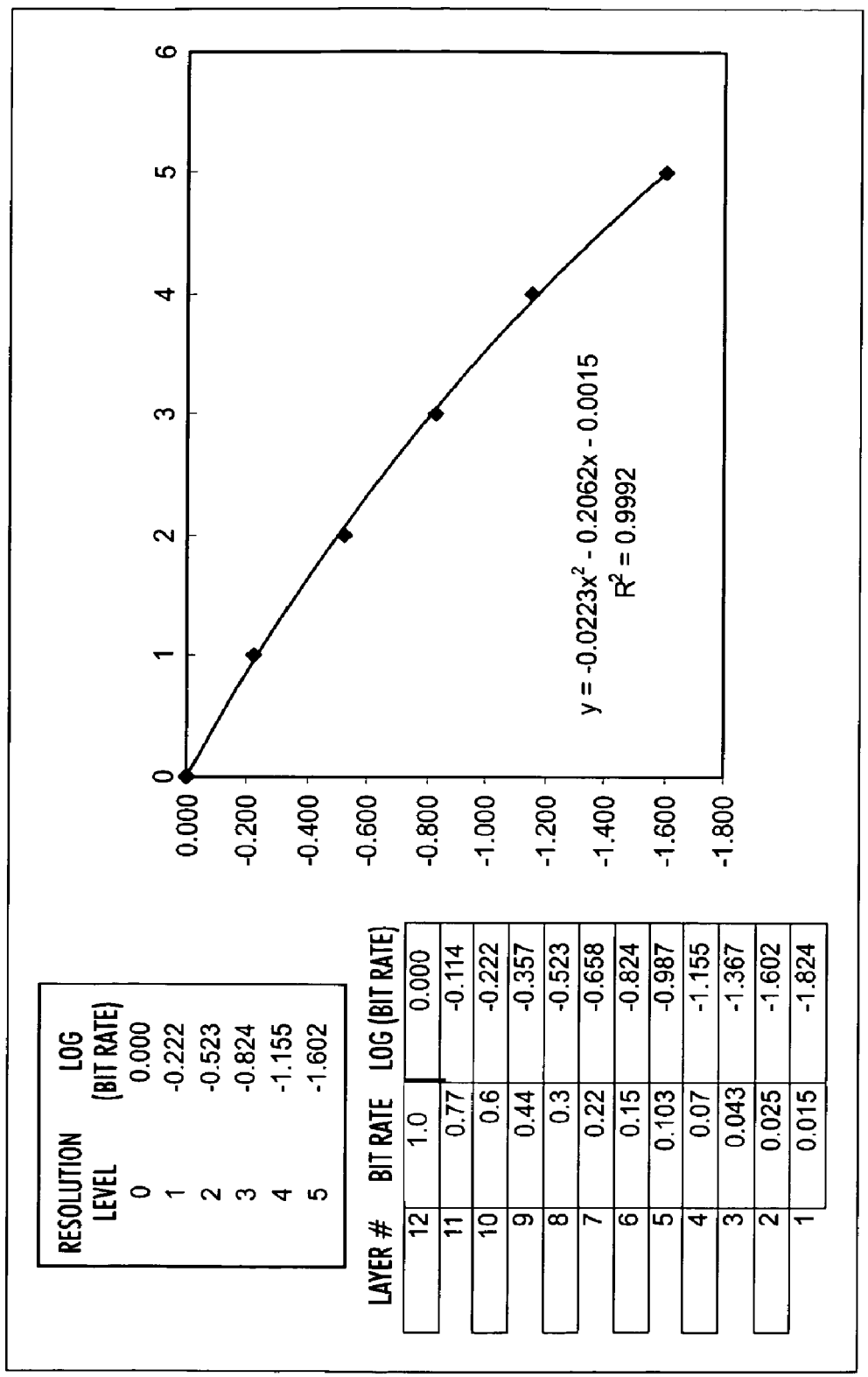
FIG. 5 is a graph showing the relationship between several resolution levels and respective corresponding quality layer sets.

Referring to an investigation in FIG. 5, and based on the image decompression experiments referred to above, an empirically determined function f(N) is considered. The investigation was performed by decompressing an image at resolution levels 0-5 with several quality layers for each level. The preferred layer numbers ("layer#") were obtained by selecting six quality layers 2, 4, 6, 8, 10, and 12, through observation, and respectively corresponding these layers with six bit rates from 12 bit rates, namely 0.025, 0.07, 0.15, 0.3, 0.6, and 1. The six bit rates were converted to logarithms and plotted against resolution levels. As demonstrated by FIG. 5, the six observed bit rates are fit well by a quadratic function.

Additionally, referring to Table 2 immediately below, information relating to a profile with 25 layers covering a range from 1 to 0.015625 bits per pixel, or the equivalent compression ratio (CR) range of 8:1 to 512:1, is shown:

TABLE 2

| Layer Definition | | |
|---|---|---|
| Layer | Bit rate | CR |
| 1 | 1.0 | 8.0 |
| 2 | 0.84 | 9.5 |
| 3 | 0.7 | 11.4 |
| 4 | 0.6 | 13.3 |
| 5 | 0.5 | 16.0 |
| 6 | 0.4 | 20.0 |
| 7 | 0.35 | 22.9 |
| 8 | 0.3 | 26.7 |
| 9 | 0.25 | 32.0 |

TABLE 2-continued

Layer Definition

| Layer | Bit rate | CR |
|---|---|---|
| 10 | 0.21 | 38.1 |
| 11 | 0.18 | 44.4 |
| 12 | 0.15 | 53.3 |
| 13 | 0.125 | 64.0 |
| 14 | 0.1 | 80.0 |
| 15 | 0.088 | 90.9 |
| 16 | 0.075 | 106.7 |
| 17 | 0.0625 | 128.0 |
| 18 | 0.05 | 160.0 |
| 19 | 0.04419 | 181.0 |
| 20 | 0.03716 | 215.3 |
| 21 | 0.03125 | 256.0 |
| 22 | 0.025 | 320.0 |
| 23 | 0.0221 | 362.0 |
| 24 | 0.01858 | 430.6 |
| 25 | 0.015625 | 512.0 |

Figure 6:
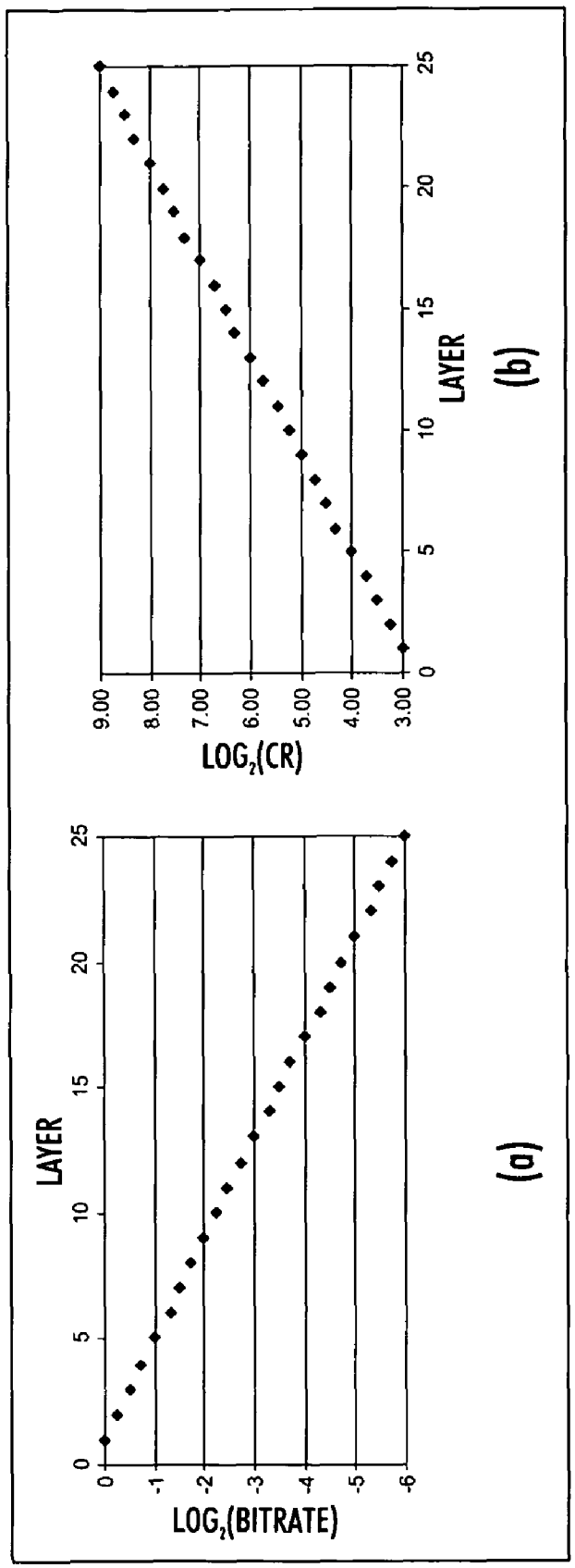
FIG. 6 includes graphs respectively showing the distribution of bit rates and compression ratios over 25 layers.

With respect to Table 2, the logarithms (base 2) of the bit rates (or equivalently the compression ratios) are close to uniformly distributed between the maximum and minimum values. FIG. 6 reflects the distribution of bit rates and compression ratios in Table 2 over the layers. Using the plots of FIG. 6, the following approximate relationships between (a) Bit Rate and layer number (L), and (b) CR and L were determined:

$$\text{Bit rate} = 2^{(0.25-0.25\,L)}$$

$$CR = 2^{(2.75+0.25\,L)}$$

Also, with respect to Table 2 and the corresponding plots of FIG. 6, the exact bit rate values or compression ratios used in the profile are not critical. Rather, an adequate range of values should be provided, and there should be sufficient values to provide an adequate sampling within that range.

As should now appear from the above description, the disclosed embodiments can be advantageously used in generating image derivatives. It is known that JPEG2000 permits the replacement of multiple image variants (one or more of such variants being pre-computed and stored in anticipation of their use), such as two sizes of thumbnails, or a full device resolution image (including, for example, a screen image or a print-resolution image), with a single JPEG2000-compressed image. In turn, the multiple image variants can be computed from the single JPEG2000-compressed image on demand as needed. As contemplated by the disclosed embodiments, fewer quality layers could be used when generating one image derivative type (e.g., a small thumbnail image) than when generating a second image derivative type (e.g., a full screen image). Using fewer layers, or only as many as required, saves time in the generation of the image derivative.

Additionally, values for resolutions and quality layers can be suitably corresponded in one of a variety of ways. For instance, in one example, a look-up table can be used to correspond resolutions $R_1, R_2, \ldots R_N$ respectively with quality layers $Q_1, Q_2, \ldots Q_N$. Of course the object of corresponding $R_1$ with $Q_1$, $R_2$ with $Q_2$, and so on, could readily be achieved by other means recognizable by those skilled in the art, such as a computational function.

Finally, it will be appreciated by those skilled in the art that the disclosed embodiments do not simply relate to JPEG2000 implementations. Rather, it is contemplated that the disclosed embodiments would be well suited for use with any "analogous" compression technique affording quality options in decompression.

Various features, among others, should now appear from the disclosed embodiments:

First, in accordance with the disclosed embodiments, an image to be decompressed at a given resolution level, or having a given image type, is decompressed with less quality layers than would normally be used for the given resolution level or image type without observable loss of image quality. As disclosed, acceptable image appearance is maintained while decompression time is reduced.

Second, multiple resolutions or image types may be corresponded with multiple quality layer sets so that the quality layers used for decompression varies as a function of specified resolution or image type. In this way, decompression time is not needlessly wasted on images with, among other things, relatively lower resolution.

Third, the decompression technique can be used in a document management system with a wide variety of clients. It should be appreciated that reducing the speed of decompression on a handheld device, while maintaining acceptable image appearance, could be particularly advantageous for a user who might not find image appearance (but would find decompression time) to be critical.

Fourth, a useful relationship between layer number, bit rate and compression ratio has been determined. In one example, bit rates and compression ratios are organized in a layer definition profile, which profile can serve as a basis for developing one of several equations. Additionally, the profile can be used to select a bit rate or compression ratio that makes a sufficient number of bits available to adequately represent an associated compressed image data.

Finally, in addition to increasing process speed, it has been found that the approach of the disclosed embodiments leads to a memory saving when storing compressed data. More, particularly, since compressed image size tracks quality layers (once a resolution has been selected), then less compressed data storage is required when less quality layers are employed.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for decompressing a job in a document management system, the job including compressed image data, the compressed image data being encoded using a plurality of resolution levels, each resolution level having a corresponding set of quality layers, comprising:

buffering, using a memory buffer, the compressed image data;

determining a number of resolution levels of the compressed print related data to be decompressed;

selecting, using a processor, a number of quality layers of the compressed print related data to be decompressed, the selection of the number of quality layers of the compressed print related data to be decompressed, being based upon the determined number of resolution levels of the compressed print related data to be decompressed, the number of quality layers to be decompressed for each resolution level being equal, the number of selected quality layers being less than a number of quality layers in the set of quality layers; and decompressing the compressed image data based upon the selected number of quality layers and the determined number of resolution levels.

2. The method of claim 1, wherein the selection of the number of quality layers of the compressed print related data to be decompressed is based upon the determined resolution level and an image type of the compressed image data.

3. The method of claim 1, wherein the selection of the number of quality layers of the compressed print related data to be decompressed is based upon the determined resolution level and a function of a compression ratio.

4. The method of claim 1, wherein the selection of the number of quality layers of the compressed print related data to be decompressed is based upon the determined resolution level and a function of a bit rate.

5. A decompression system for decompressing a job in a document management system, the job including compressed image data, the compressed image data being encoded using a plurality of resolution levels, each resolution level having a corresponding set of quality layers, and the compressed image data being buffered in memory, comprising:

a processor;

said processor determining a number of resolution levels of the compressed print related data to be decompressed;

said processor selecting a number of quality layers of the compressed print related data to be decompressed, the selection of the number of quality layers of the compressed print related data to be decompressed, being based upon the determined number of resolution levels of the compressed print related data to be decompressed, the number of quality layers to be decompressed for each resolution level being equal, the number of selected quality layers being less than a number of quality layers in the set of quality layers;

said processor decompressing the compressed image data based upon the selected number of quality layers and the determined number of resolution levels.

6. The decompression system of claim 5, further comprising:

a look-up table, said look-up table mapping a determined resolution level to a number of quality layers to be selected for decompression.

7. The decompression system of claim 5, wherein the selection of the number of quality layers of the compressed print related data to be decompressed is based upon the determined resolution level and a function of a bit rate.

8. The decompression system of claim 5, wherein the selection of the number of quality layers of the compressed print related data to be decompressed is based upon the determined resolution level and a function of a compression ratio.

9. A printing system for processing a print job including compressed print related data, the compressed print related data being encoded using a plurality of resolution levels, each resolution level having a corresponding set of quality layers, comprising:

a decompression system for decompressing the compressed print related data;

said decompression system including a processor and a program for decompressing the compressed print related data;

said decompression system determining a number of resolution levels of the compressed print related data to be decompressed;

said decompression system selecting a number of quality layers of the compressed print related data to be decompressed, the selection of the number of quality layers of the compressed print related data to be decompressed, being based upon the determined number of resolution levels of the compressed print related data to be decompressed, the number of quality layers to be decompressed for each resolution level being equal, the number of selected quality layers being less than a number of quality layers in the set of quality layers;

said decompression system decompressing the compressed print related data based upon the selected number of quality layers and the determined number of resolution levels.

10. The printing system of claim 9, wherein said decompression system further includes a look-up table, the look-up table mapping a determined resolution level to a number of quality layers to be selected for decompression.

* * * * *